United States Patent [19]

Dury

[11] Patent Number: 4,907,363
[45] Date of Patent: Mar. 13, 1990

[54] WEATHER INSULATED TIP-UP LIGHT MOUNTING

[76] Inventor: Thomas P. Dury, 136 Park Heights Ave., Dover, N.J. 07801

[21] Appl. No.: 239,279

[22] Filed: Sep. 1, 1988

[51] Int. Cl.⁴ ............................................. A01K 97/12
[52] U.S. Cl. .......................................... 43/15; 43/16; 43/17
[58] Field of Search ....................... 43/15, 16, 17, 17.5

[56] References Cited

U.S. PATENT DOCUMENTS

| | | | |
|---|---|---|---|
| 2,538,788 | 1/1951 | Massino | 43/17 |
| 2,785,493 | 3/1957 | Thiel | 43/17 |
| 2,786,294 | 3/1957 | Whitacre | 43/17 |
| 3,078,610 | 2/1963 | Howell | 43/17 |
| 3,264,773 | 8/1966 | Woznick | 43/17 |
| 3,378,945 | 4/1968 | Johnson | 43/17 |
| 3,545,118 | 12/1970 | Stelmach | 43/17 |
| 4,376,349 | 2/1983 | Yarczower | 43/17.5 |
| 4,528,554 | 7/1985 | Kefbeck | 43/16 |
| 4,633,608 | 1/1987 | Savarino | 43/17 |
| 4,697,374 | 10/1987 | Simms | 43/17.5 |

*Primary Examiner*—Nicholas P. Godici
*Assistant Examiner*—Michael William Starkweather
*Attorney, Agent, or Firm*—Thomas L. Adams

[57] ABSTRACT

A signal apparatus is used in combination with a fishing rig. The rig includes a substantially upright mast and a normally straight resilient strip. The resilient strip has one end fixed near the top of the mast and another end releasably secured on the mast at a position to bow the mast. The signal apparatus includes a case having a lower cavity sized to receive the top of the mast to support the case. The case has a lateral cavity sized to receive a storage source of electrical energy. A pair of battery terminals is mounted at opposite ends of the lateral cavity. An electrical light is mounted atop the case. A switch is mounted laterally upon the case opposite the lateral cavity. The switch is serially connected with the electrical light and the pair of battery terminals. The switch has a laterally projecting, reciprocatable, electrically isolated actuator for operating the switch to close and open the circuit with the light and the battery terminals. The actuator is positioned to engage the resilient strip when it is secured in a bowed position and to open the circuit. The actuator is operable to close the circuit when the resilient strip is released to a substantially straight condition.

10 Claims, 1 Drawing Sheet

U.S. Patent    Mar. 13, 1990    4,907,363
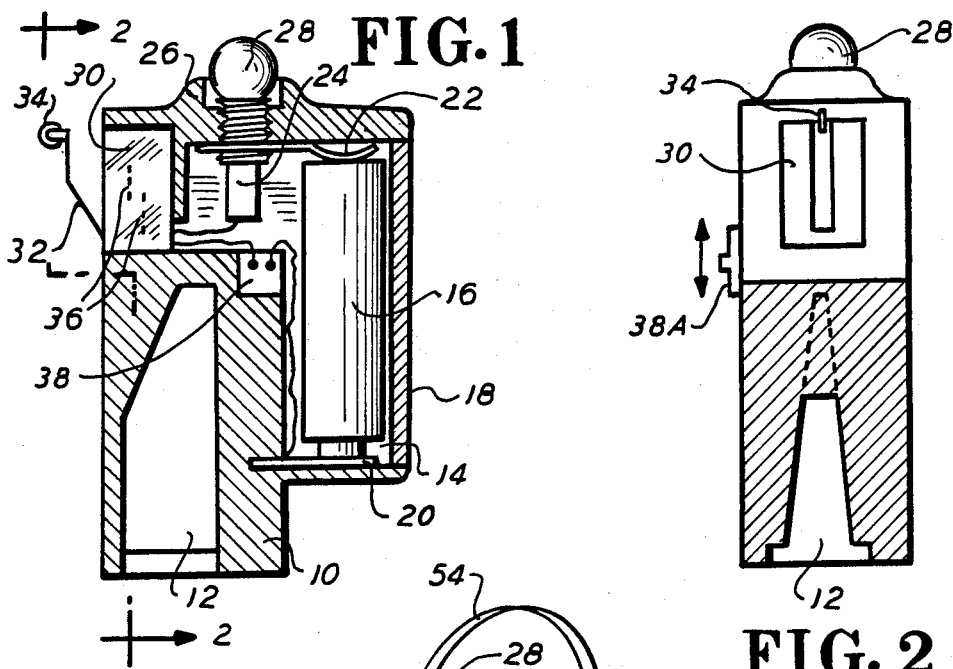
FIG. 1
FIG. 2
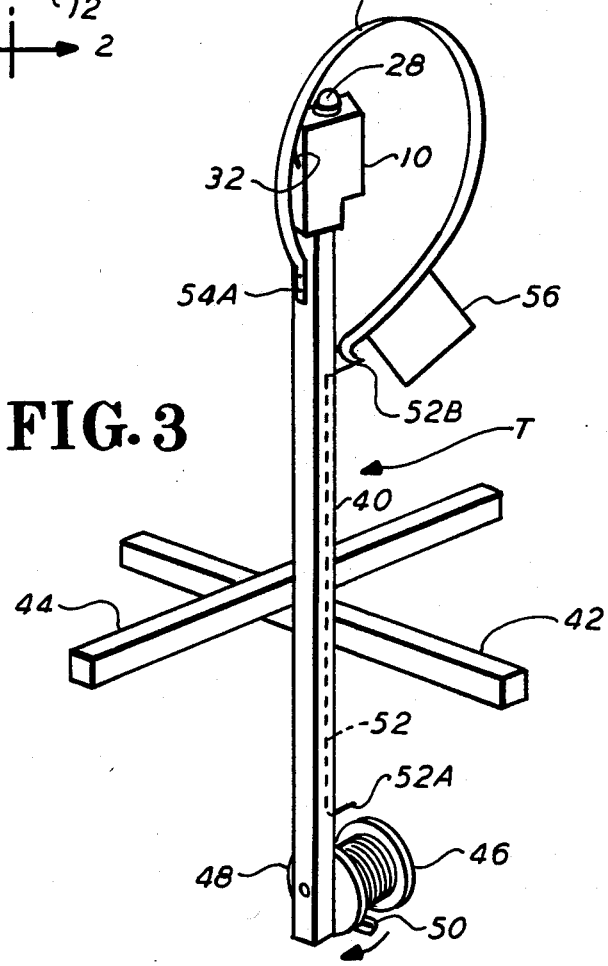
FIG. 3

4,907,363

WEATHER INSULATED TIP-UP LIGHT MOUNTING

BACKGROUND OF THE INVENTION

The present invention relates to light for a tip-up, and in particular, to a light that is protected from the elements.

Commercially available tip-ups comprise a vertical mast having a reel on a lower end and a flag on an upper end. The flag is mounted on a resilient strip that can be bowed down and held by a catch. When a fish strikes, the reel rotates and releases the catch so that the resilient strip is erected to display the flag.

The tip-up is used for ice fishing, and it is frequently used at dawn or dusk when visibility of an erect flag is difficult.

Known accessory lights for a tip-up have been mounted on the top of the mast of the tip-up. These known lights illuminate when the flag is released. For example, in U.S. Pat. No. 3,378,945, the battery case has a light atop it and a pair of electrical contacts exposed to the elements. This device relies on the resilient strip of the flag being made of metal. By properly positioning the battery case, the metal strip can engage the two exposed contacts on the battery case and close a circuit. A disadvantage with this known signalling apparatus is the exposure of the electrical contacts. First, the quality of electrical connections through the resilient strip varies depending upon the model type of the tip-up and the surface oxidation on the metal strip. Furthermore, the reliability of the connection is affected by the exposure of the contacts on the battery case to the elements. Over time, these contacts will oxidize and be fouled by various contaminants.

Thus, known tip-up lights have been prone to failure due to the unreliable configuration of their electrical contacts. See also U.S. Pat. Nos. 2,538,788; 2,785,493; 2,786,294; 3,078,610; 3,264,773; and 3,545,118; and 4,633,608.

Another disadvantage with known tip-up lights is the structure used to support the light on the tip-up mast. Known lights have used open brackets that slide around the mast but do not enclose it on four sides. Thus, the possibility of the brackets prying apart leaves the light vulnerable loosening and falling from the mast, especially when a fish strikes the rig.

Accordingly, there is a need for an improved light for a tip-up which is reliable and secure.

SUMMARY OF THE INVENTION

In accordance with the illustrative embodiment demonstrating features and advantages of the present invention, there is provided a signal apparatus in combination with a fishing rig. The rig includes a substantially upright mast and a normally straight resilient strip having one end affixed near the top of the mast. The other end of the resilient strip is releasably secured on the mast at a position to bow the mast. The signal apparatus includes a case having a lower cavity sized to receive the top of the mast to support the case. The case has a lateral cavity sized to receive a stored source of electrical energy. The signal apparatus includes a pair of battery terminals mounted at opposite ends of the lateral cavity. Also included is an electrical light mounted atop the case and a switch means. The switch means is mounted laterally upon the case opposite the lateral cavity. The switch means is serially connected with the electrical light and the pair of battery terminals. The switch means has a laterally projecting, reciprocatable, electrically isolated actuator for operating the switch means to close and open the circuit with the light and battery terminals. The actuator is positioned to engage the resilient strip when it is secured in a bowed position and to open the circuit. The actuator is operable to close the circuit when the resilient strip is released to a substantially straight position.

By employing such apparatus, an improved light is provided for a tip-up. In a preferred embodiment, the light is mounted atop a molded case which has a tapered lowered cavity sized to fit over the top of the mast of a tip-up. This preferred apparatus has a microswitch mounted on the side, near the top of the case. An actuator arm extends laterally to engage the resilient strip holding the flag on the tip-up. Because the microswitch has preferably a weather-tight case, its internal contacts are not exposed to the elements and do not rely on the electrical conductivity of the resilient strip holding the flag of the tip-up.

In this preferred embodiment a battery is held inside the case to the side of the lower cavity. Being arranged in this fashion, the tip-up light can be relatively compact and does not extend appreciably above the mast of the tip-up. Thus, minimal interference with the normal operation of tip-up is expected.

Furthermore, by arranging the switch to be above the lower cavity holding the mast, the switch actuator can have a lateral extension which is not excessive and does not interfere with normal operation of the tip-up.

BRIEF DESCRIPTION OF THE DRAWINGS

The above brief description, as well as other objects, features and advantages of the present invention will be more fully appreciated by reference to the following detailed description of presently preferred, but nonetheless illustrative embodiments in accordance with the present invention when taken in conjunction with the accompanying drawings wherein:

FIG. 1 is a side view, partially in section, of a signal apparatus, according to the principles of the present invention;

FIG. 2 is a view, partially in section, taken along line 2—2 of FIG. 1; and

FIG. 3 is a perspective view of the apparatus of FIG. 1 shown mounted atop the mast of a fishing rig.

DETAILED DESCRIPTION OF A PREFERRED EMBODIMENT

Referring to FIGS. 1 and 2, a signal apparatus is shown employing a case 10 preferably formed of injection-molded plastic. A lower cavity 12 is open from the bottom of case 10 and is sized to receive the mast of a tip-up. Lower cavity 12 is tapered so that it can accommodate various sizes of masts. Case 10 has a complex shape but may be generally considered to be a rectangular solid having a lateral rectangular protrusion to allow space for a lateral cavity 14. Cavity 14 is sized to accept a storage source 16, shown herein as a type AA battery, although other sizes, (especially smaller sizes) can be used instead. Lateral cavity 14 is closed by a removable door 18 which is sized to snap into a corresponding opening in case 10.

Mounted at the floor of cavity 14 is a battery terminal 20 shown herein as a stamped metal strip, imbedded into the illustrated aperture within case 10. Opposite terminal 20 is a spring contact 22 that extends into the case 10 and is threaded around the barrel of light socket 24. Socket 24 is threaded into the internally threaded opening atop case 10. Coaxial with socket 24 is an annular ridge 26 encircling electrical light 28, shown installed in socket 24.

Above cavity 12 is an opening sized to receive a switch means, shown herein as microswitch 30 having a switch housing from which extends an actuator arm 32 terminating in a miniature roller 34. Microswitch 30 has internal contacts 36 that are shielded from the elements.

Slide switch 38 is mounted in a cavity in case 10 to act as a power on/off switch. Switch 38 is shown serially connected with microswitch 30 between battery contacts 20 and 22.

As shown in FIG. 2, cavity 12 tapers throughout its length. This view illustrates only one dimension over which tapering occurs. The tapering in the other dimension is illustrated in FIG. 1. This latter tapering starts above the mid-point of cavity 12. Being configured in this way, variously sized and shaped masts can be wedged into cavity 12. It will be appreciated, however, that different cavity shapes can be employed in other embodiments. Slide handle 38A of previously illustrated slide switch 38 is shown in this view.

To facilitate an understanding of the principles associated with the foregoing apparatus, its operation will be described in connection with the tip-up of FIG. 3. In FIG. 3 previously described case 10 is shown mounted atop mast 40 of a tip-up T. Tip-up T includes, in this embodiment, cross members 42 and 44, both orthogonally mounted to mast 40. Cross members 42 and 44 provide a base for vertically supporting mast 40 about an ice hole. On the bottom of mast M is a rig comprising a reel 46 which has a line that can terminate in a hook and the usual fishing gear. Reel 46 has a circular inside plate 48 which has a radially extending tab 50. When reel 46 rotates, tab 50 can engage catch 52, shown herein having a lower protrusion 52A and an upper protrusion 52B forming a means for holding resilient strip 54 in a bowed position. Catch 52 is in the form of an axially rotatable rod. Lower protrusion 52A is simply a right angle bend in the rod. Upper protrusion 52B comprises two right angle bends as illustrated.

Resilient strip 54 is shown having its lower end riveted or screwed to mast 40 at location 54A. The upper end of strip 54 has a flag 56 which may be colored red, for example. Case 10 can be mounted on the end of mast 40 with its actuator 32 facing strip 54. When mounted, switch handle 38A is placed in its "on" position.

In operation, the tip-up T is set up by extending the cross members 42 and 44 as illustrated. The line on reel 46 is played out in the usual fashion. Strip 54 can be bowed downwardly so that the end carrying flag 56 is adjacent to protrusion 52B. Catch 52 is rotated so that the protrusion 52B engages the hook-shaped end of strip 54. Once loaded in this fashion, the flag 56 stays down. The tip-up T can then be placed in an ice hole.

With the flag down as illustrated in FIG. 3, strip 54 bears against actuator 32 to open its normally closed contacts. Under these circumstances, light 20A is off.

When a fish strikes the line, reel 46 rotates in the direction indicated causing tab 50 to engage protrusion 52A. Consequently, catch 52 rotates clockwise (looking down). As a result, protrusion 52B disengages the hooked end of strip 56. Thereafter, strip 54 straightens to project vertically and display flag 56.

With the bending force removed from strip 54, its pressure on actuator 32 is released. Consequently, actuator 32 can move out slightly. As a result, the circuit is closed to illuminate light 28. When fishing at dusk or dawn and prevailing light is poor, illumination of light 28 makes it apparent to the fisherman that the tip-up has a strike.

It will be noted that because microswitch 30 (FIG. 1) is mounted over the lower cavity 12, the actuator 32 (FIG. 3) can be close to the axis of mast 40. Therefore, the actuator 32 can operate in the position shown without being excessively depressed by strip 54.

When done fishing, the fisherman can remove case 10 from the tip-up, move switch handle 38A to the "off" position and store the equipment.

It is to be appreciated that various modifications may be implemented with respect to the above described preferred embodiments. For example, the tip-up may be of various forms, and the mast can have various cross-sections. The lower cavity for receiving the mast can likewise have different cross-sections and different tapers, depending upon the expected size and resiliency of the mast. Various electrical lights and battery types can be used, depending upon the desired brightness and longevity. The case can be formed of various plastics although material other than plastic can be used without departing from the scope of the present invention. Instead of microswitches, various other switches can be used instead. It is only desired that the switch be relatively compact and have an actuating force tailored to the strip that operates it. The size and various dimensions of the case and its cavities can be altered depending upon the size of the tip-up and the light and battery associated with the case. It is to be understood that the actuator can take various shapes and may contact the inside or outside surface of the strip, depending upon the shape of the actuator. While the actuator is shown with a miniature roller, in other embodiments such a roller may not be employed.

Obviously, many modifications and variations of the present invention are possible in light of the above teachings. It is, therefore, to be understood that within the scope of the appended claims, the invention may be practiced otherwise than as specifically described.

What is claimed is:

1. In combination with a fishing rig including a substantially upright mast and a normally straight resilient strip having one end affixed near the top of said mast and another end releasably secured on said mast at a position to bow said strip, a signal apparatus comprising:

a case having a lower cavity sized to receive the top of said mast to support said case, said case having a lateral cavity sized to receive a storage source of electrical energy;

a pair of battery terminals mounted at opposite ends of said lateral cavity;

an electrical light mounted atop said case; and a switch means mounted laterally upon said case opposite said lateral cavity and serially connected with said electrical light and said pair of battery terminals, said switch means having:

a pair of electrical contacts; and a laterally projecting actuator which has biasing means biased towards said resilient strip, said actuator operating said switch means to close and open a circuit with said light and said battery terminals, said actuator being reciprocatable from a closed to an open position, said actuator being mounted to be electrically isolated from said contacts, said actuator being positioned to engage said resilient strip when it is secured in a bowed position and to open the circuit, said actuator being operable to close the circuit when said resilient strip is released to a substantially straight condition.

2. In a combination as defined by claim 1 wherein said switch means comprises:

a hollow switch housing, said actuator being mechanically coupled to said pair of contacts to mechanically and electrically separate them at a point of separation, said contacts being mounted inside said switch housing to isolate them and said point of separation of said contacts from the elements.

3. In a combination as defined by claim 2 wherein said lower cavity is tapered.

4. In a combination as defined by claim 3 wherein said lateral cavity is closed on all sides, including the top and bottom, to protect said lateral cavity from the elements.

5. In a combination as defined by claim 4 wherein said case has an annular ridge rising above a plateau and encircling said electrical light to shield it from the elements.

6. In a combination as defined by claim 5 wherein said switch means is located over said lower cavity, said actuator of said switch means and said lateral cavity being at diametrically opposite positions with respect to said lower cavity.

7. In a combination as defined by claim 6 wherein said lateral cavity is parallel to and laterally spaced from said lower cavity, said lower and lateral cavities being positioned at overlapping heights.

8. In a combination as defined by claim 7 wherein said lower cavity has a length more than half the height of said case.

9. In combination as defined by claim 8 wherein said case has a removable door fitting closely and opening into said lateral cavity.

10. In a combination as defined by claim 9 wherein said case and said switch housing are water tight.

* * * * *